US008612935B2

(12) United States Patent
Fujii

(10) Patent No.: US 8,612,935 B2
(45) Date of Patent: Dec. 17, 2013

(54) INPUT SUPPORTING METHOD OF VARIABLE NAME IN PROGRAMMING OF PLC

(75) Inventor: Yutaka Fujii, Kusatsu (JP)

(73) Assignee: Omron Corporation, Kyoto (JP)

( * ) Notice: Subject to any disclaimer, the term of this patent is extended or adjusted under 35 U.S.C. 154(b) by 531 days.

(21) Appl. No.: 12/714,394

(22) Filed: Feb. 26, 2010

(65) Prior Publication Data

US 2010/0235812 A1  Sep. 16, 2010

(30) Foreign Application Priority Data

Mar. 13, 2009 (JP) ................................ P2009-062105

(51) Int. Cl.
*G06F 9/44* (2006.01)

(52) U.S. Cl.
USPC ........... 717/120; 717/121; 717/122; 717/123; 717/124; 717/125; 717/126; 717/127; 717/128; 717/129; 717/130; 717/131; 717/132; 717/133; 717/134; 717/135

(58) Field of Classification Search
None
See application file for complete search history.

(56) References Cited

U.S. PATENT DOCUMENTS

| 5,553,297 | A | * | 9/1996 | Yonezawa et al. | 700/18 |
| 5,699,080 | A | * | 12/1997 | Oshiga et al. | 345/157 |
| 5,825,306 | A | * | 10/1998 | Hiyokawa et al. | 340/988 |
| 5,905,891 | A | * | 5/1999 | Harada et al. | 717/146 |
| 6,424,908 | B2 | * | 7/2002 | Urban et al. | 701/538 |
| 6,823,183 | B2 | * | 11/2004 | Narusawa | 455/412.1 |
| 7,271,825 | B2 | * | 9/2007 | Dara-Abrams | 348/14.01 |
| 7,451,397 | B2 | * | 11/2008 | Weber et al. | 715/267 |
| 7,664,597 | B2 | * | 2/2010 | Imanishi | 701/424 |
| 7,912,632 | B2 | * | 3/2011 | Ohashi et al. | 701/424 |
| 7,991,543 | B2 | * | 8/2011 | Hayashi et al. | 701/461 |
| 8,141,000 | B2 | * | 3/2012 | Hirosawa | 715/829 |
| 2005/0097233 | A1 | * | 5/2005 | Oka et al. | 710/9 |
| 2005/0222697 | A1 | * | 10/2005 | Inoue et al. | 700/87 |
| 2006/0090154 | A1 | * | 4/2006 | Bustelo et al. | 717/110 |
| 2006/0179120 | A1 | * | 8/2006 | Kegoya et al. | 709/217 |
| 2006/0247806 | A1 | * | 11/2006 | Inoue et al. | 700/86 |
| 2006/0259823 | A1 | * | 11/2006 | Sohm et al. | 714/38 |
| 2009/0044094 | A1 | * | 2/2009 | Rapp | 715/220 |

FOREIGN PATENT DOCUMENTS

| EP | 0 789 224 A2 | 8/1997 |
| JP | 2006-172445 A | 6/2006 |
| WO | WO 97/46951 A1 | 12/1997 |

OTHER PUBLICATIONS

European Patent Office search report for Application No. 10154847.7 mailed May 26, 2010; 3 pages.
The State Intellectual Property Office of the People's Republic of China First Office Action on application No. 201010125024.1 dated Jul. 19, 2011; pp. 1-5.

* cited by examiner

*Primary Examiner* — Henry Tsai
*Assistant Examiner* — Jing-Yih Shyu
(74) *Attorney, Agent, or Firm* — Foley & Lardner LLP

(57) ABSTRACT

This invention enables a target variable name to be confirmed without inputting all the character string even when a method of giving a name such as allocating a number to the end of the name is performed from the necessity to allocate a variable name having the same meaning to a plurality of different addresses. If narrowed down variable name exists in plurals and one or two or more continuous next character strings match each other among the variable names, the series of character strings without any choice are automatically adopted and confirmed as the character string of the target variable name without waiting for the input of an operator.

6 Claims, 7 Drawing Sheets

FIG. 3

| NAME | DATA TYPE | ADDRESS / VALUE | COMMENT |
|---|---|---|---|
| Set_Data | CHANNEL | D0 | WRITE DATA |
| Symbol_Data1 | BOOL | 0.00 | SYSTEM DATA 1 |
| Symbol_Data2 | BOOL | 0.01 | SYSTEM DATA 2 |
| Symbol_Data3 | BOOL | 0.02 | SYSTEM DATA 3 |
| Symbol_Data4 | BOOL | 0.03 | SYSTEM DATA 4 |
| System1 | BOOL | 0.04 | SYSTEM 1 |
| System2 | BOOL | 0.05 | SYSTEM 2 |
| Test_Data1 | CHANNEL | D1 | TEST DATA 1 |
| Test_Data2 | CHANNEL | D2 | TEST DATA 2 |

EXPLANATORY VIEW SHOWING ONE EXAMPLE OF VARIABLE TABLE

EXPLANATORY VIEW OF DISPLAY STATE OF DISPLAY WHEN CHARACTER "S" IS INPUTTED

EXPLANATORY VIEW OF DISPLAY STATE OF DISPLAY WHEN CHARACTER "m" IS INPUTTED

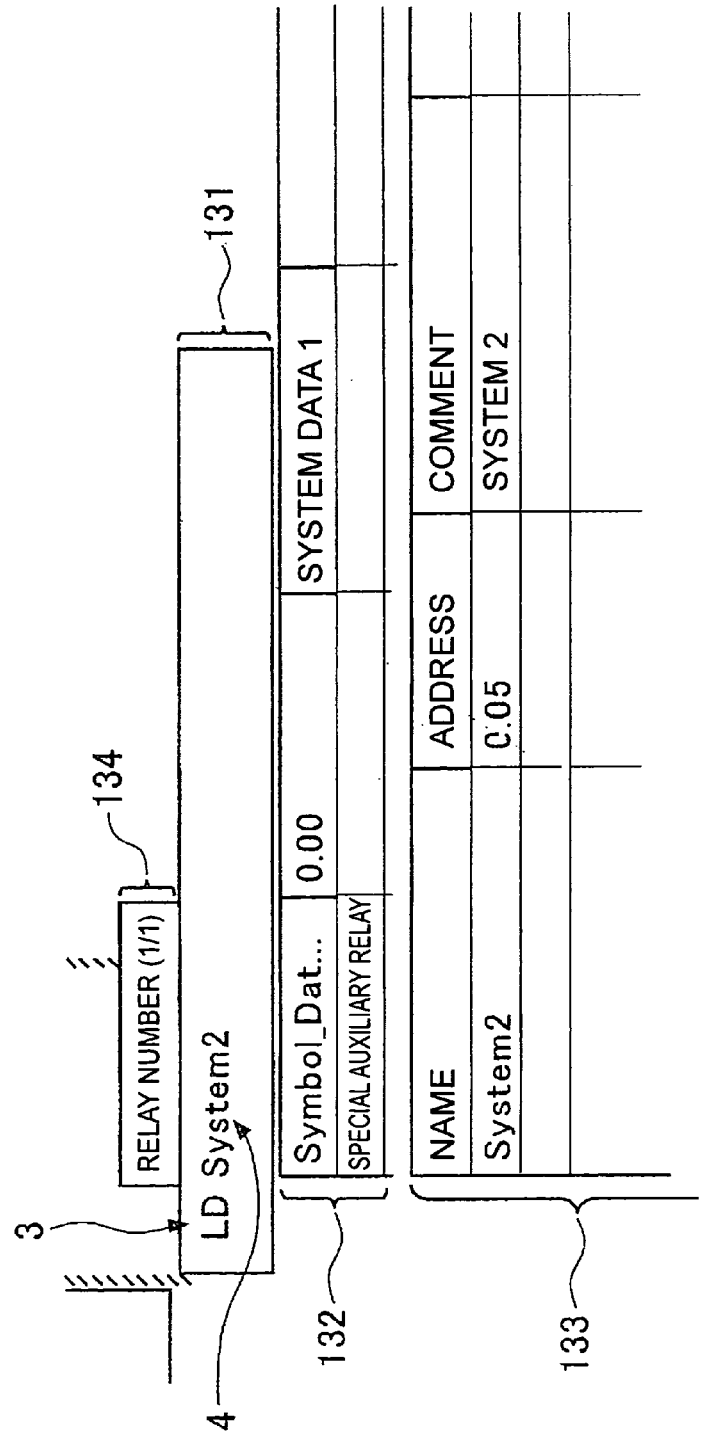

INPUT SUPPORTING METHOD OF VARIABLE NAME IN PROGRAMMING OF PLC

This application is based on Japanese Patent Application No. 2009-062105 filed with the Japan Patent Office on Mar. 13, 2009, the entire content of which is hereby incorporated by reference.

BACKGROUND OF THE INVENTION

1. Technical Field

The present invention relates to input supporting methods of a variable name suitable for incorporation etc. to a program development supporting device of a PLC, and in particular, to an input supporting method of a variable name used when inputting a variable name as an operand of a command.

2. Related Art

Conventionally, an operand of a command (e.g., LD command, AND command, MOV command etc.) contained in a ladder program of a programmable controller (hereinafter referred to as PLC) is generally described with an address (which indicates the position in a memory where data handled in the program are stored, and which is represented with a digit sequence of a plurality of digits or with a character indicating the type of data added to the head of the digit sequence). When describing the operand with an address, devisal has been made to facilitate the understanding of the semantic content of each operand by adding a command to each address.

In recent years, the operand of the command can be described with a variable name including an arbitrary character string, and programming in variable base such as the high-level language of a personal computer is being actively pursued. In programming in variable base, the meaning of the address corresponding to the operand can be intuitively understood by describing the operand with a variable name, and a program excelling in maintenance can be provided.

If the operand is described with a variable name, the program can be easily reused even if change is made in the application of the address corresponding to the operand by simply changing the address to assign to the variable name (e.g., editing the table showing the correspondence of variable name and address) without changing the program.

Most operands in the ladder program of the PLC are often bit type (BOOL type), where a several thousand or, in some cases, a several tens of thousands of operands needs to be described in one program for the bit type operand.

If the variable name is used for the operand in such a case, the variable needs to be defined with a long character string so that duplication of the variable name does not occur, and so as to understand the meaning with the variable name. In other words, a digit sequence of about few words is required in a similar case if the address is used for the operand, whereas a character string of a few dozens of characters (e.g., alphabet string) is required if the variable name is used for the operand, and hence the input of the character string takes time and the efficiency of the programming is not satisfactory.

In order to enhance the programming efficiency, a function of searching the variable table with which the variable name is registered every time one character is inputted, narrowing down the character string of the target variable name, extracting that in which the character next to the confirmed character is the smallest in alphabetical order from the narrowed down variable names, and displaying the extracted character as a candidate of the variable name. Such a function is generally called an autocomplete function.

SUMMARY

The autocomplete function narrows down the variable names to become the next input candidate, extracts one variable name therefrom and guide displays the same to the user, but the characters needed to be continuously inputted if the guide displayed variable name differs from the variable name desired to be inputted.

In particular, as for giving variable names, when variable names of the same meaning are allocated to a plurality of different addresses, there are cases where respective numbers are allocated to the ends of the names. In such a case, the variable name cannot be confirmed until all the character string is inputted.

The present invention has been devised to solve the problems described above, and an object thereof is to provide an input supporting method, device, and computer program of a variable name in the programming of the PLC capable of confirming the target variable name without inputting all the character string even when a method of giving a name such as allocating a number to the end of the name is performed from the necessity to allocate a variable name having the same meaning to a plurality of different addresses.

Other further objects and effects of the present invention should be easily recognized by those skilled in the art by referencing the following description of the specification.

In accordance with one aspect of the present invention, the technical problems described above can be solved with the input supporting method of the variable name in the programming of the PLC having the following configurations.

The above method supports the inputting of a variable name to become the operand of one command used in a ladder program of a PLC, based on a variable table in which a variable name used in a user program of a PLC as an operand of a command is registered with an attribute thereof.

The method includes a first step, a second step, a third step, and a fourth step.

The first step obtains a state one character of a character string configuring the variable name to become the operand of the one command can be inputted.

The second step sequentially confirms the one word as one word of a variable name to become an operand of the command, every time one word is inputted, and then, narrows down variable names registered in the variable table to those starting from a series of character strings having been confirmed up to this time point.

The third step compares the next character of the one character newly confirmed in the second step among the narrowed down variable names, and every time the next character is determined to match among all narrowed down variable names, advances the next character by one character and repeats the comparing operation among the variable names until determined that the next character does not match among all variable names.

The fourth step which confirms a series of character strings as an overall variable name to become the operand of the command language, the series of character strings having been determined to match while waiting until the number of variable names that have been narrowed down by the second step becomes singular while the first to third units are being repeatedly operated.

According to such a method, when the variable name narrowed down in the second step exists in plurals, and one or two or more next continuous character strings match each other among the variable names, the series of character strings without any choice are automatically adopted and confirmed as the character string of the target variable, and thus the user is free from the trouble of manually inputting the character strings and can concentrate only on the input of the character string that requires the actual selection, and hence the number of character inputs can be made to a requisite minimum in the input operation of this type of variable name, and the operability can be significantly improved. As a result, the target variable name can be confirmed without inputting all the character string even when the method of giving a name such as allocating a number to the end of the name is performed from the necessity of allocating the variable name having the same meaning to a plurality of different addresses.

In a preferred embodiment of the above method, a preliminary narrow-down step of narrowing down the variable names that may be the target of narrow-down to a variable name having a data type (e.g., BOOL type, CHANNEL type and the like) that may be the operand of the command may be further provided at a pre-stage of the second step.

According to such an embodiment, the variable name narrowed down in the second step automatically becomes the variable name having the data type that may become the operand of the relevant command, and thus the ultimately confirmed variable name can be used as the operand of the command, and the occurrence of bug in the ladder program can be prevented beforehand when the command and the data type of the operand become no-match.

In a preferred embodiment of the above method, a display step of displaying, on a predetermined display, the character string that has been confirmed as the part of the variable name may be further provided.

According to such an embodiment, false operation such as redundantly inputting the character and forgetting to input the character can be prevented beforehand since the input operation of the variable name can be carried out while visually checking the character string confirmed up to the current time point.

In a preferred aspect of the above embodiment, the display step may further include a step of additionally displaying the variable name narrowed down in the second step on the display as a final variable name candidate.

According to such an embodiment, the correct variable name can be reliably inputted through visual sense even if the target variable name is not exactly memorized since the input operation of the variable name can be carried out after visually checking the target variable from the displayed variable name candidates.

In a preferred embodiment of the above method, the display step may further include a step of displaying the character string determined as a part of the variable name and non-confirmed character string after the one confirmed character string of the variable names narrowed down in the second step in series, and displaying the confirmed character string in a first display mode and the non-confirmed character string in a second display mode.

According to such a configuration, the input operation of the character string can be easily and conveniently carried out while checking up to which character of the character string configuring the target variable name is confirmed and while referencing one candidate of the non-confirmed character string due to the difference in the first display mode and the second display mode.

In accordance with another aspect of the present invention, the technical problems described above can be solved with the input supporting device of the variable name in the programming of the PLC having the following configurations.

The device supports the inputting of a variable name to become the operand of one command used in the ladder program, based on the variable table in which a variable name used in the user program of the PLC as an operand of a command is registered with an attribute thereof.

The device includes a first unit, a second unit, a third unit, and a fourth unit.

The first unit obtains a state one character of a character string configuring a variable name to become the operand of the one command can be inputted.

The second unit sequentially confirms the one word as one word of a variable name to become an operand of the command, every time the one word is inputted, and then, narrows down variable names registered in the variable table to those starting from a series of character strings having been confirmed up to this time point.

The third unit compares the next character of the one character newly confirmed in the second unit among the variable names narrowed down, and every time the next character is determined to match among all narrowed down variable names, advances the next character by one character and similarly repeats the comparing operation among the variable names until determined that the next character does not match among all variable names and additionally confirms the series of next character strings that have been determined to match by then, as part of a character string to become the operand of the command language.

The fourth unit confirms a series of character strings as an overall variable name to become the operand of the command language, the series of character strings having been determined to match while waiting until the number of variable names that have been narrowed down by the second unit becomes singular while the first to third units are being repeatedly operated.

In a preferred embodiment of the above device, a preliminary narrow-down unit of narrowing down the variable names that may be the target of narrow-down to a variable name having a data type that may be the operand of the command may be further provided in the second unit.

In a preferred embodiment of the above method, a display unit may be further provided, which displays, on a predetermined display, the character string that has been confirmed as the part of the variable name.

In a preferred embodiment of the above device, the display unit may further include a unit of additionally displaying the variable name narrowed down in the second step on the display as a final variable name candidate.

In a preferred embodiment of the above device, the display unit may further include a unit of displaying the character string determined as a part of the variable name and non-confirmed character string after the one confirmed character string of the variable name narrowed down in the second step in series, and displaying the confirmed character string in a first display mode and the non-confirmed character string in a second display mode.

The effects of the devices and the embodiments thereof are substantially the same as those of the methods and the embodiments thereof, and thus redundant description will be omitted.

In accordance with still another aspect of the present invention, the technical problems described above can be solved with a non-transitory computer-readable medium including a computer program for implementing the input supporting device of the variable name in the programming of the PLC having the following configurations.

The program causes a computer including at least a character input unit for inputting characters in units of one character, a display for displaying characters and images, a storage unit defined with a work region used in calculation and a variable table storage region stored with a variable table, and a calculation unit for executing various types of programs, to function as an input supporting device of a variable name in programming of a PLC. A variable name used in a user program of the PLC along with an attribute thereof is registered with the variable table.

The computer program includes a first step, a second step, a third step, and a fourth step.

The first step obtains a state one character of a character string configuring the variable name to become the operand of the command can be inputted through the character input unit.

The second step sequentially confirms the one word as one word of a variable name to become an operand of the command, every time one word is inputted through the character input unit, and then, narrows down variable names registered in the variable table to those starting from a series of character strings having been confirmed up to this time point.

The third step compares the next character of the one character newly confirmed in the second step among the variable names narrowed down, and every time the next character is determined to match among all narrowed down variable names, advances the next character by one character and similarly repeats the comparing operation among the variable names until determined that the next character does not match among all variable names and additionally confirms the series of next character strings that have been determined to match by then, as part of a character string to become the operand of the command language.

The fourth step confirms a series of character strings as an overall variable name to become the operand of the command language, the series of character strings having been determined to match while waiting until the number of variable names that have been narrowed down in the second step becomes singular while the first to third steps are being repeated.

In a preferred embodiment of the program, a preliminary narrow-down step of narrowing down the variable names that may be the target of narrow-down to a variable name having a data type that may be the operand of the command may be further provided at a pre-stage of the second step.

In a preferred embodiment of the above program, a display step of displaying, on a predetermined display, the character string that has been confirmed as the part of the variable name may be further provided.

In a preferred embodiment of the program, the display step may further include a step of additionally displaying the variable names narrowed down in the second step on the display as a final variable name candidate.

In a preferred embodiment of the program, the display step may further include a step of displaying the character string determined as a part of the variable name and non-confirmed character strings after the one confirmed character string of the variable name narrowed down in the second step in series, and displaying the confirmed character string in a first display mode and the non-confirmed character string in a second display mode.

ADVANTAGEOUS EFFECT OF THE INVENTION

The effects of the programs and the embodiments thereof are substantially the same as those of the method and the embodiments thereof, and thus redundant description will be omitted.

According to the present invention, when there are a plurality of variable names that have been narrowed down in the second step, and one or two or more continuous character strings match each other among the variable names, the series of character strings without any choice are automatically adopted and confirmed as the character string of the target variable name, and thus the user is free from the trouble of manually inputting the character strings and can concentrate only on the input of the character string that requires the actual selection, and hence the number of character inputs can be made to a requisite minimum in the input operation of this type of variable name, and the operability can be significantly improved.

BRIEF DESCRIPTION OF THE DRAWINGS

FIG. 3 is an explanatory view showing one example of a variable table;

FIG. 7 is an explanatory view of a display state of a display when a character "2" is inputted.

DETAILED DESCRIPTION

One preferred embodiment of an input supporting method, device, and computer program of a variable name in the programming of a PLC according to the present invention will be described in detail with reference to the accompanying drawings.

Figure 1:
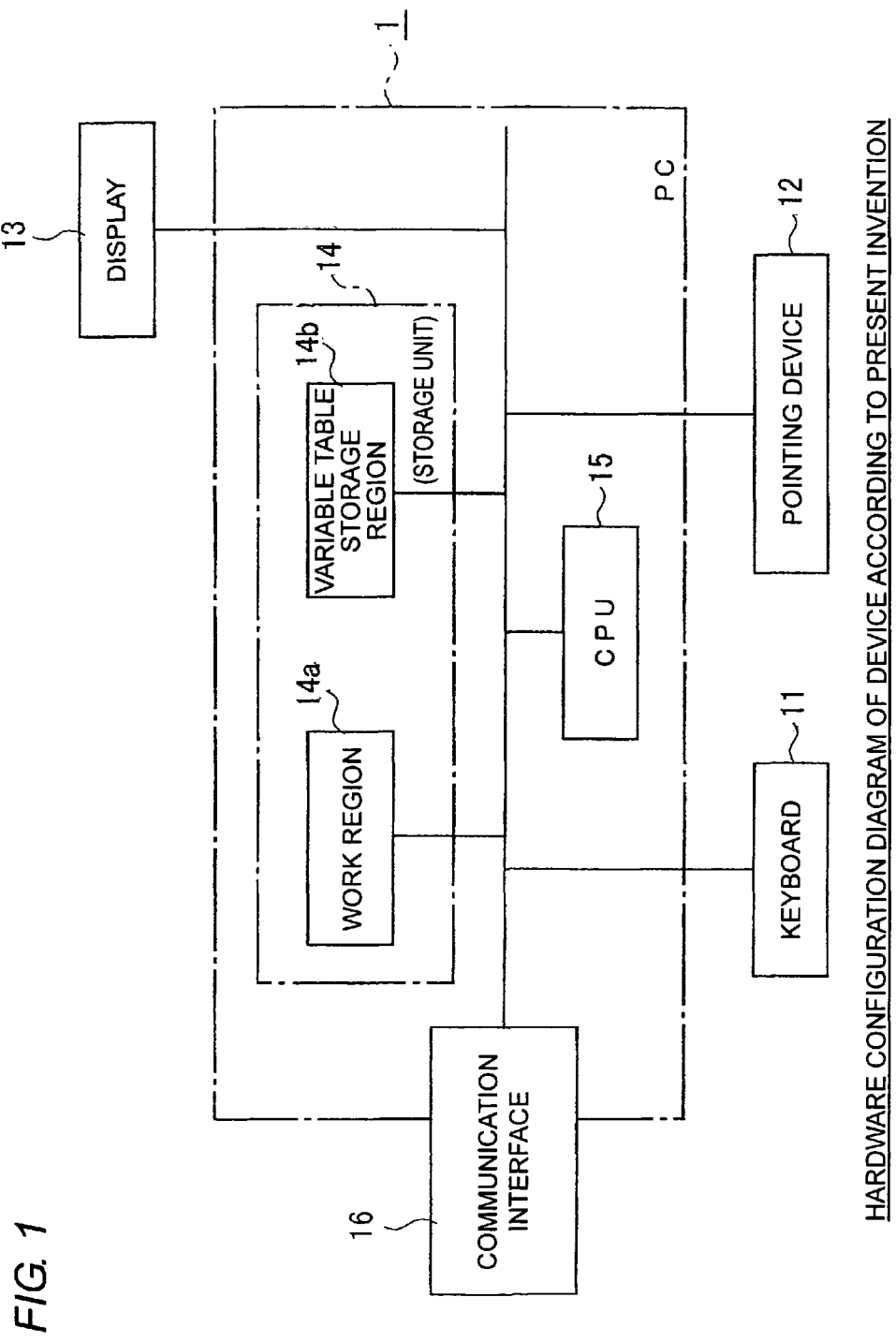
FIG. 1 is a hardware configuration diagram of a device according to the present invention.

The method, device, and program according to the present invention can be incorporated in a program development supporting device configured by installing dedicated software to a personal computer (PC). A general hardware configuration of the personal computer (PC) functioning as the program development supporting device is shown in FIG. 1.

As shown in the figure, the personal computer (PC) 1 includes a keyboard 11 serving as a character input unit in which the character can be inputted in units of one character, a pointing device 12 such as a mouse, a display 13 capable of displaying characters and images, a storage unit 14 defined with a work region 14a used in the calculation and a variable table storage region 14b stored with a variable table (see FIG. 3 for details), a CPU 15 functioning as a calculation unit for executing various types of programs, an external storage device such as a hard disc driver and CD driver (not shown), and a memory (RAM etc.) for developing various types of dedicated software read from the external storage device.

A communication interface 16 for conducting a communication (download, upload, monitor, etc. of a ladder program) with the PLC and the like (not shown) is also provided.

The variable table storage region 14b is stored with a variable table in which a variable name used as an operand of the command in the ladder program of the PLC is registered in association with the attribute thereof (data type, address, value, etc.). One example of the variable table is shown in FIG. 3.

As shown in the figure, in this example, the variable table 2 includes a name field, a data type field, an address/value field, and a comment field. The character string (including alphabet, number, symbol) corresponding to the variable name is stored in the name field, the data type (including CHANNEL, BOOL) is stored in the data type field, the address (0.00, 0.01 . . . 0.05,) and value (D0, D1, D2) are stored in the address/data field, and the comment (write data, system data 1 to 4, system 1, 2, test data 1, 2) is stored in the comment field.

The CHANNEL indicates a data type that handles data in units of 16 bits, and BOOL indicates a data type that handles data in units of one bit. D0, D1, and D2 indicate $0^{th}$ channel, first channel, and second channel, that is, addresses where the 16 bit data are stored, and 0.00, 0.01, . . . , 0.05 respectively indicate the $00^{th}$ bit, $01^{th}$ bit, . . . , fifth bit of the $0^{th}$ channel where the bit data are stored.

The method and the device according to the present invention are implemented by installing the program development support software incorporating the operand input supporting program according to the present invention to the personal computer 1 having the hardware configuration shown in FIG. 1, and operating the same.

Figure 2:
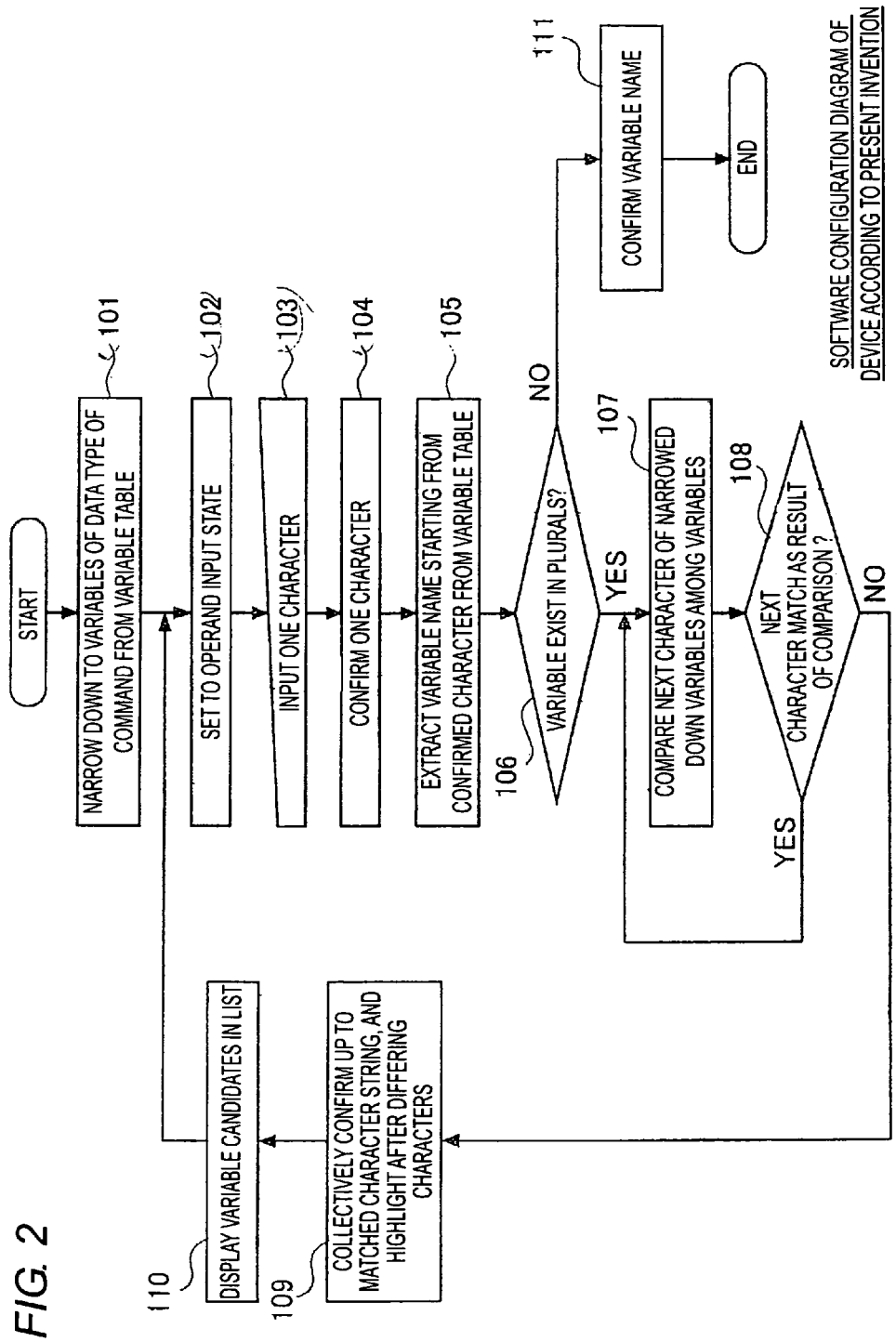
FIG. 2 is a software configuration diagram of a device according to the present invention.

The operation of the operand input supporting program portion according to the present invention will be described in detail while referencing the flowchart of FIG. 2. The configuration of this type of program development supporting software itself realizes creating, editing, monitoring, and the like of the ladder program, where a detailed description on the configuration of the program development supporting software itself will be omitted as various types have already been provided by many companies handling PLC products, and are well known.

The operation of the program shown in the flowchart starts following the completion of input of the instruction word (e.g., LD, AND, OR, MOV, etc.) of one ladder instruction.

First, in step 101, a preliminary narrow-down process of the variable name is executed. In the preliminary narrow-down process, all variable names registered in the variable table (see FIG. 3) are searched by the data type that is to be inputted at the relevant time point to narrow down to only the variable names that match the relevant data type. If the target command is LD, which is a command of bit type operand, the variable names that become the input candidates are narrowed down to only the variable names in which the data type is BOOL (bit type).

Figure 4:
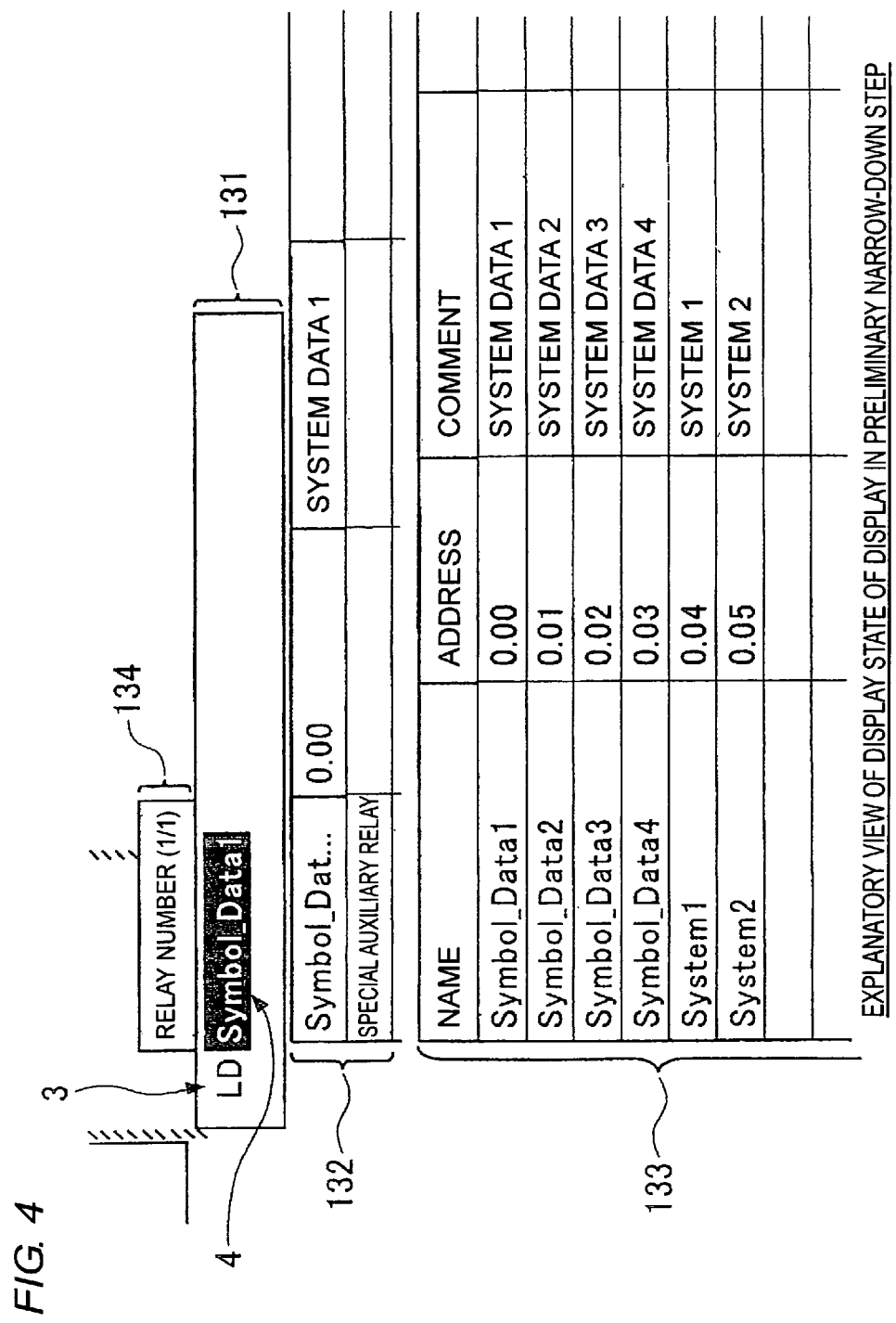
FIG. 4 is an explanatory view of a display state of a display in a preliminary narrow-down step.

When a displaying process (steps 109, 110), to be described later, is executed, the display state on the screen of the display shown in FIG. 4 is obtained. As shown in the figure, the screen includes an input data display region 131, a next candidate variable name explanation field 132, a variable name candidate list 133, and a relay number display region 134.

In the input data display region 131, a display mode (highlighted in the example) indicating that the variable name "Symbol_Data1", which becomes the next candidate, is not confirmed is displayed following the already inputted instruction word "LD". The already inputted instruction word "LD" is displayed in the display mode (non-highlighted in the example) indicating that it is already confirmed.

The next candidate variable name explanation field 132 is arranged immediately below the input data display field 131, where attribute information (address, comment, etc.) related to the temporarily determined variable name "Symbol_Data1" is displayed in the relevant field.

The variable name candidate list 133 is arranged immediately below the next candidate variable name explanation field, where a series of variable names narrowed down in the preliminary narrow-down process (step 101) is displayed with the attribute information in the relevant list 133. As apparent by comparing the variable name candidate list of FIG. 4 and the variable table of FIG. 3, the variable names of CHANNEL type that existed in the variable table 2 are all excluded in the variable names listed in the variable name candidate list 133 as a result of executing the preliminary narrow-down process (step 101).

In this example, the variable name positioned the very first in the narrowed down variable candidate list 133 is assumed as the temporarily determined variable name, and highlighted in the input data display region 131.

In the following step 102, a state in which the character (including alphabets, numbers, characters, in the example) corresponding to the operand can be inputted through the keyboard is set. If one character is inputted from the keyboard 11 in such a state (step 103), a process of confirming such an inputted character ("S" in the example) as one character (first character at this time point) of the character string configuring the operand is executed in the following step 104.

In the following step 105, a process of narrowing down the variable names starting from the character "S" from the variable name group (see variable name candidate list 133 of FIG. 4) narrowed down in the preliminary narrow-down process (step 101) is executed by executing forward search with the confirmed character ("S" in the example) as the search key.

In the following step 106, a determination process on whether or not the number of such narrowed down variable names is in plurals (two or more) is performed. If the number of the narrowed down variable names is single (one) (NO in step 106), this means that that target variable is reached, and the target variable name is immediately confirmed with all the character string of the relevant narrowed down variable name.

If the number of narrowed down variable names is in plurals (two or more) (YES in step 106), the next character of the one character ("S" in the example) newly confirmed in step 104 is compared among the variable names narrowed down in step 105 (step 107), and every time the next character is determined to match among all narrowed down variable names (YES in step 108), the next character is advanced by one character and the comparing operation (step 107) is similarly repeated among the variable names until determined that the next character does not match among all variable names (NO in step 108).

In this example, the next character of the one character "S" confirmed in step 104 is assumed as "y" for all narrowed down variables. Thus, the comparison result in step 107 is determined as match (YES in step 108), and the comparison process (step 107) is further executed on the next character. In the example, the next character is "m" for the four upper variables, but "s" for the two bottom variables in the narrowed down variables, and thus match is not found for all variables (NO in step 108).

The process then proceeds to step 109, the matched character strings are collectively confirmed, and the process of having the different character and the subsequent characters in the display mode indicating non-confirmed state (highlighted in the example) is executed. The display mode of the display in this case is shown in FIG. 5.

As shown in the figure, according to the example, only the matched character string "Sy" is in the display mode indicating confirmed state (non-highlighted display in the example), and the no-match character string "mbol_Data1" is in the display mode indicating no-confirmed state (highlighted display in the example) in the input data display region 131. In addition, an input position display mark 131a is given to the next input character position.

Figure 5:
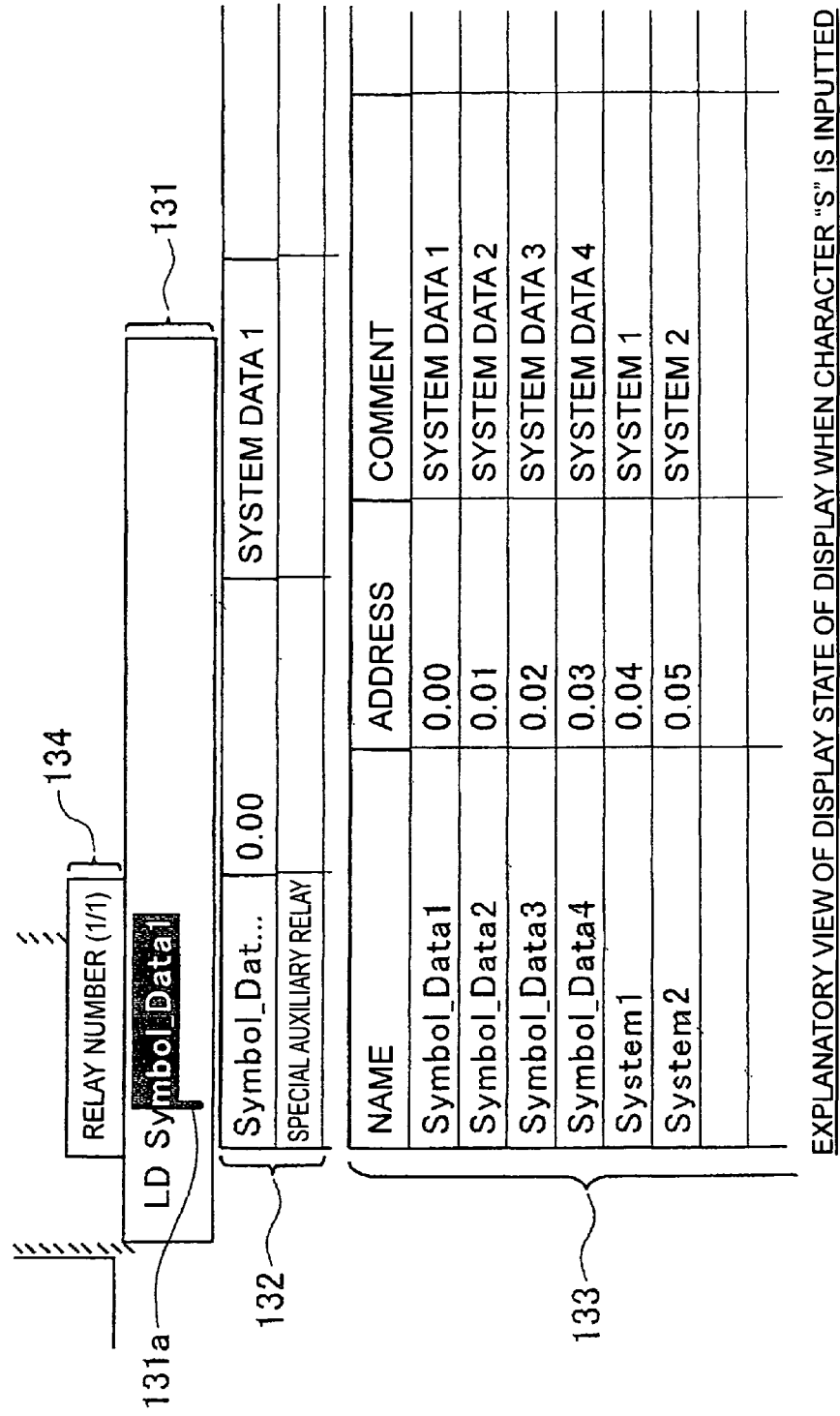
FIG. 5 is an explanatory view of a display state of a display when a character "S" is inputted.

In the following step 110, a process of displaying the variable candidates in a list is executed, so that the variable name candidate list 133 is displayed on the screen of the display 13, as shown in FIG. 5. Therefore, the user can visually check the character string of the variable name to input based on the variable name candidate list 133, and can easily check the character string of the desired variable name from the variable name candidate list without memorizing the entire long character string.

Thereafter, the process returns to step 102, and the series of processes (step 102 to 110) are repeated. In the example, "s" is inputted and confirmed by the user as the next character (steps 102, 103, 104), and the forward search is executed with the series of character strings "Sys" confirmed up to this point as the search key, so that the process of extracting the variable names starting from the character string "Sys" from the variable name group (see variable name candidate list 133 of FIG. 4) narrowed down in the previous process (step 105) is executed. As a result, the variable name that becomes the candidate of the operand is further narrowed down to two, as apparent from the variable name candidate list 133 of FIG. 6.

In the following step 106, a determination process on whether or not the number of such narrowed down variable names is in plurals (two or more) is performed. As described above, if the number of the narrowed down variable names is single (one) (NO in step 106), this means that that target variable is reached, and the target variable name is immediately confirmed with all the character string of the relevant narrowed down variable name.

If the number of narrowed down variable names is in plurals (two or more) (YES in step 106), the next character of the one character ("S" in the example) newly confirmed in step 104 is compared among the variable names narrowed down in step 105 (step 107), and every time the next character is determined to match among all narrowed down variable names (YES in step 108), the next character is advanced by one character and the comparing operation (step 107) is similarly repeated among the variable names until determined that the next one character does not match among all variable names (NO in step 108).

In this example, the variable name that becomes the candidate of the operand is narrowed down to two, and thus the number of narrowed down variable names is determined as more than one (YES instep 106), and the comparison process on the character next to the character "s" confirmed in step 104 is performed (step 107). In the example, the next character is "t" for all variables. Thus, the comparison result in step 107 is determined as match (YES in step 108), and the comparison process (step 107) is further executed on the next character. In the example, the two subsequent characters "e", "m" exactly match with respect to the two variables. The comparison process (step 107) is further performed on the next character, where the character is "1" for the upper variable and "2" for the lower variable in the two narrowed down variables, and thus the character does not match in all variables (NO in step 108).

The process then proceeds to step 109, the matched character strings are collectively confirmed, and the process of having the different character and the subsequent characters in the display mode indicating non-confirmed state (highlighted in the example) is executed. The display mode of the display in this case is shown in FIG. 6.

As shown in the figure, according to the example, only the matched character string "System" is in the display mode indicating confirmed state (non-highlighted display in the example), and the no-match character string "1" is in the display mode indicating no-confirmed state (highlighted display in the example) in the input data display region 131.

Figure 6:
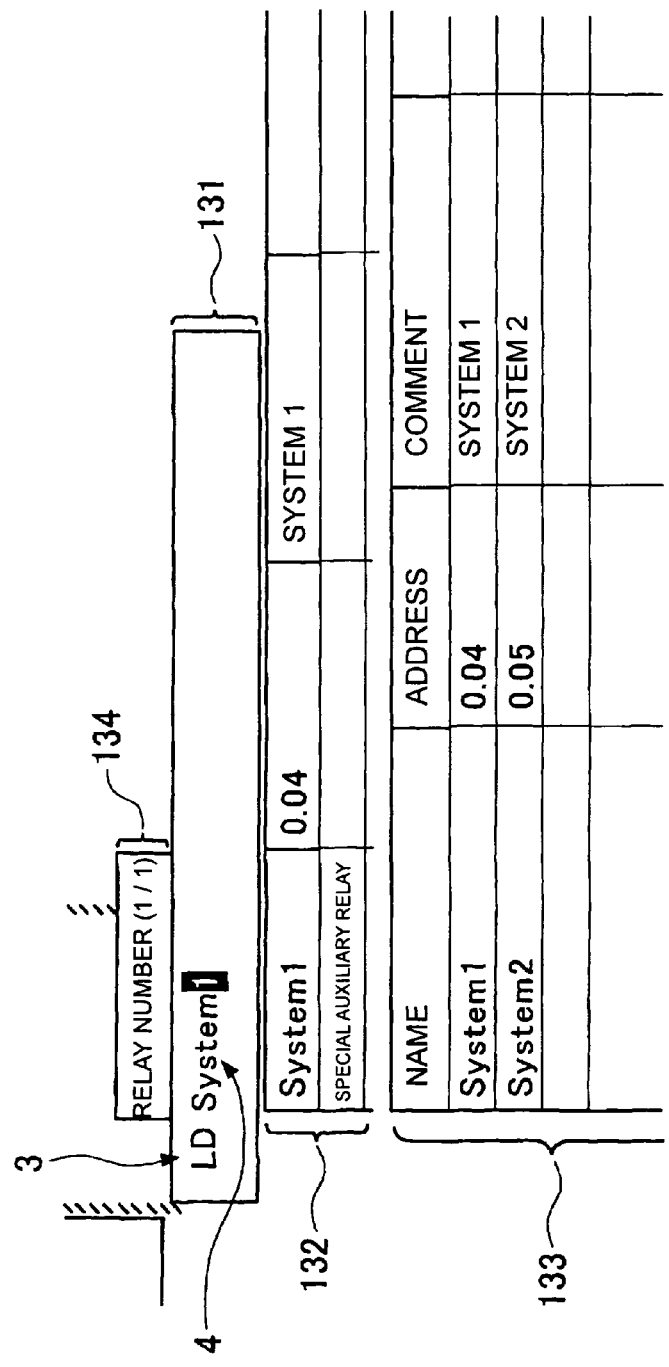
FIG. 6 is an explanatory view of a display state of a display when a character "m" is inputted.

In the following step 110, a process of displaying the variable candidates in a list is executed, so that the variable name candidate list 133 is displayed on the screen of the display 13, as shown in FIG. 6.

Thereafter, the process returns to step 102, and the series of processes (step 102 to 110) are repeated. In the example, "2" is inputted and confirmed by the user as the next character (steps 102, 103, 104) as a next character, and the forward search is executed with the series of character strings "System_2" confirmed up to this point as the search key, so that the process of extracting the variable names starting from the character string "System_2" from the variable name group (see variable name candidate list 133 of FIG. 6) narrowed down in the previous process (step 105) is executed. As a result, the variable name that becomes the candidate of the operand is further narrowed down to one, as apparent from the variable name candidate list 133 of FIG. 7.

In the following step 106, a determination process on whether or not the number of such narrowed down variable names is in plurals (two or more) is performed. As described above, if the number of the narrowed down variable names is single (one) (NO in step 106), this means that that target variable is reached, and the target variable name is immediately confirmed with all the character string of the relevant narrowed down variable name.

In the example, the number of narrowed down variables is determined as one (NO in step 106), and the process proceeds to step 111, and the target variable name to become the operand is confirmed with all character string "System_2" configuring the one variable.

As apparent from the above embodiment, in the example, the number of characters the user actually inputs from the keyboard is merely three, "S", "s", and "3" when generating the character string "System_2", in which seven characters are continued, from the variable table 2 shown in FIG. 3, and thus the editing operation of the ladder program of describing the operand with this type of variable name can be carried out at significantly high efficiency.

In particular, in the programming of the ladder program in which the operand is described with such a variable name, a method of giving a name such as allocating a number to the end of the name is often carried out when there is a need to allocate the variable name having the same meaning to a plurality of different addresses, but the effort required in inputting the variable name can be alleviated as much as possible in such a case according to the present invention.

In the above embodiment, the characters that can be used as the character string are alphabets, numbers, and symbols, but can obviously be extended to arbitrary characters such as Hiragana, Katakana, Kanji, and characters of foreign languages other than English, in addition to the above.

In the above embodiment, the confirmation of the character automatically inputted sequentially in step 107 is collectively carried out in step 109, but confirmation may be carried out every time one character is automatically inputted.

In the above embodiment, the preliminary narrow-down process (step 101) is provided at the start of process, but the preliminary narrow-down process (step 101) may obviously be omitted.

In the above embodiment, the variable candidate list 133 is used merely for visual checking, but obviously, the variable name may be selected from the variable candidate list 133 with the mouse operation by arranging an appropriate GUI. Generally, however, the number of variables is often several hundred to several thousands, in which case, a complicated operation such as scrolling the screen will be required for the selecting operation.

In the above embodiment, the keyboard 11 is used for the input operation of one character, but the character displayed on the screen may be touch inputted by arranging an appropriate GUI, or the character may be inputted without using the keyboard by clicking with the mouse.

Furthermore, in the above embodiment, the present invention is applied to the user program, and among them, the ladder program language, but the application of the present invention is not limited only to the ladder program language, and it should be recognized that the present invention can be similarly applied to program languages other than the ladder program in the five program languages defined in the International Electro-technical Commission IEC 61131-3.

The present invention enables the input operation to become easy and convenient while minimizing the number of input characters when inputting the operand of the ladder instruction such as LD, AND, OR, MOV, and CTR with a variable name using alphabets in creating or editing the ladder program in the program development supporting device of the PLC.

What is claimed is:

1. An input supporting method of a variable name for specifying the variable name as an operand of a command in programming of a programmable controller (PLC), wherein a computer comprises at least a processor and an input device and supports selecting the variable name from a variable table in which at least one variable name scheduled to be used in a user program is registered in advance with an attribute thereof, the method comprising:
   a first step of obtaining, using the computer, a state, wherein one character of a character can be inputted using the input device;
   a second step of extracting, using the computer, when the one character is inputted, from the variable table, all variable names that forward match with a character string, comprising a character string, confirmed up to now and the one character;
   a third step of completing, using the computer, the specification of the operand of the one command by confirming the variable name as the operand in a case where the number of the extracted variable names is one; and
   a fourth step of confirming, using the processor of the computer, a forward matching portion including a continuous character string of all extracted variable names with each other as the confirmed character string before returning to the first step, in a case where the number of extracted variable names is more than one and the continuous character string matches among all the extracted variable names;
   wherein, prior to obtaining the state in the first step, the method further comprises a preliminary narrow-down step of narrowing down, using the computer, variable names that can be targeted for extraction to at least one variable name having a data type that can be specified as the operand of the command;
   wherein the method further comprises a display step of displaying, using the computer, on a predetermined display, the character string determined as the confirmed string in the fourth step; and
   wherein the display step further includes a step of sequentially displaying, using the computer, the character string determined as the confirmed character string in the fourth step and a non-confirmed character string following the confirmed character string in one of the variable names extracted in the second step, wherein the confirmed character string is displayed in a first display mode and the non-confirmed character string is displayed in a second display mode.

2. The input supporting method of the variable name in the programming of the PLC according to claim 1, wherein the display step further includes a step of additionally displaying, using the computer, the variable names extracted in the second step on the display as final variable name candidates.

3. An input supporting device of a variable name configured to specify the variable name as an operand of a command in programming of a programmable controller (PLC), by supporting selecting the variable name from a variable table in which at least one variable name scheduled to be used in a user program is registered in advance with an attribute thereof, the device comprising at least one computer comprising:
   a first unit configured to obtain a state, wherein the one character of a character string, which configures the variable name to become the operand of the one command, can be inputted;
   a second unit configured to extract, when the one character is inputted, from the variable table, all variable names that forward match with a character string, comprising a character string confirmed up to now and the one character;
   a third unit configured to complete the specification of the operand of the one command by confirming the variable name as the operand in a case where the number of the extracted variable names is one;
   a fourth unit configured to confirm a forward matching portion including a continuous character string of all extracted variable names with each other as the confirmed character string before returning to the first step, in a case where the number of the extracted variable names is more than one and the continuous character string matches among all the extracted variable names;
   wherein the input supporting device further comprises a preliminary narrow-down unit, which, prior to obtaining the state by the first unit, is configured to narrow down variable names that can be targeted for extraction to at least one variable name having a data type that can be specified as the operand of the one command at a pre-stage of the first unit;
   wherein the input supporting device further comprises a display unit configured to display, on a predetermined display, the character string determined as the confirmed string by the fourth unit; and
   wherein the display unit further includes a unit configured to sequentially display the character string determined as the confirmed character string in the fourth unit and a non-confirmed character string following the confirmed character string in one of the variable names extracted by the second unit, the sequential display unit being configured to display the confirmed character string in a first display mode and the non-confirmed character string in a second display mode.

4. The input supporting device of the variable name in the programming of the PLC according to claim 3, wherein the display unit further includes a unit configured to additionally displaying the variable names extracted in the second unit on the display as final variable name candidates.

5. A non-transitory computer-readable medium including a computer program for causing a computer comprising at least an input device and a processor to perform an input support method, the computer including at least a character input unit configured to input characters in units of one character, a display configured to display characters and images, a storage unit defined with a work region configured to be used in calculation and a variable-table storage region configured to store the variable table, and a calculation unit configured to execute the program; wherein a variable name scheduled to be used in a user program along with an attribute is registered in advance with the variable table; and the input method comprising,
- a first step of obtaining, using the computer, a state, wherein one character of a character string, which configures the variable name to become the operand of the one command, can be inputted by the input device;
- a second step of extracting, using the computer, when the one character is inputted, from the variable table, all variable names that forward match with a character string, comprising a character string confirmed up to now and the one character;
- a third step of completing, using the computer, the specification of the operand of the one command by confirming the variable name as the operand in a case where the number of the extracted variable names is one; and
- a fourth step of confirming, using the processor of the computer, a forward matching portion including a continuous character string of all extracted variable names with each other as the confirmed character string before returning to the first step, in a case where the number of extracted variable names is more than one and the continuous character string matches among all the extracted variable names;

wherein, prior to obtaining the state in the first step, the method further comprises a preliminary narrow-down step of narrowing down, using the computer, variable names that can be targeted for extraction to at least one variable name having a data type that can be specified as the operand of the command at a pre-stage of the first step;

wherein the input method further comprises a display step of displaying, using the computer, on a predetermined display, the character string determined as the confirmed string in the fourth step; and wherein the display step further includes a step of sequentially displaying, using the computer, the character string determined as the confirmed character string in the fourth step and a non-confirmed character string following the confirmed character string in one of the variable names extracted in the second step, wherein the confirmed character string is displayed in a first display mode and the non-confirmed character string is displayed in a second display mode.

6. The non-transitory computer-readable medium including the computer program according to claim 5, wherein the display step further includes a step of additionally displaying, using the computer, the variable names extracted in the second step on the display as final variable name candidates.

\* \* \* \* \*